2,995,452
GROUND BEEF PRODUCT AND METHOD OF PRODUCING THE SAME

David C. Odegaard, Park Forest, Ill., and Emmett E. O'Brien and Emil J. Krammer, St. Paul, Minn., assignors, by mesne assignments, to Armour and Company, Chicago, Ill., a corporation of Delaware
No Drawing. Filed July 23, 1957, Ser. No. 673,566
7 Claims. (Cl. 99—174)

This invention relates to a ground beef product and a method of producing the same.

Two factors are recognized as promoting the sale of ground beef. One is its freshness, and the other is its appearance. Since the degree of freshness or spoilage can only be determined, except in extraordinary cases, by eating, the appearance, and particularly the color, of ground beef is extremely important in its marketability. By the procedure of our invention, we are able to produce a product that can be stored under refrigeration upwards of fourteen days without spoiling and without losing the attractive coloration considered so essential in the marketability of ground beef.

Ground beef as ordinarily produced by meat packers includes from about 15 to 30% fat with the remainder being substantially lean beef. Many cuts of beef do not contain a sufficient amount of fat to make ground beef. Therefore, such cuts of beef are combined with other cuts of beef having a larger proportion of fat, or with fat itself, and ground together.

The lean meat and the fat may issue from the grinder in such forms as to provide stratification in the ground beef product. Therefore, it is a general practice in meat packing plants to grind beef twice. The ground beef product achieved by first grinding is then mixed to eliminate concentrations of fat and is then reground to provide a uniform appearing ground product. The procedure for manufacturing ground beef according to our invention is consistent with contemporary meat packing practice.

Conventionally, in the manufacture of ground meat, a beef carcass from a freshly slaughtered animal is chilled for about at least 24 hours, at which time the internal temperature of the beef is about 50° F. The carcass is then removed from the chilling room to a room containing the boning line. Ordinarily the temperature in this room ranges from about 35° to 45° F. The carcass is boned rather rapidly, in a matter of minutes. Some boning lines are capable of boning about 50 carcasses per hour.

At the end of the boning line, the meat is transferred to a grinder where the meat is ground. At this point, whole fat or fatty meat may be added, as indicated above. The ground meat then may be mixed to break up any concentrations of fat and then reground. Ground meat is ordinarily kept at temperatures of the order of about 36°–38° F. until it is sold by the retailer. Such ground meat will turn gray in appearance in a matter of a few days and become stale in the same period. Attempts have been made in the past to package ground meat, but the packaged meat also has ben incapable of being stored for more than a few days without losing freshness and attractive color.

An object of the invention is to provide a means and method for preserving ground meat with respect to color and freshness. Another object is to provide a method whereby ground meat can be effectively stored for substantial periods of time without loss of color or freshness or other desired characteristics. Still another object is to provide an improved ground meat product having better keeping qualities and greater salability. A further object is to provide an unfrozen packaged meat product which is available for use after a substantial period of storage. Other specific objects and advantages will appear as the specification proceeds.

In one embodiment of our invention, ground meat is chilled to a temperature below the gas evolution temperature of meat and maintained below such temperature during the regrinding thereof, if the meat is reground. The gas evolution temperature of the meat may vary depending upon the different types of meat. Ordinarily, we find that the internal temperature should be maintained below 42° F. to avoid gas evolution. We prefer to maintain the temperature below 38° F. After the final grinding of the meat, the meat is introduced into an air-impervious bag and sealed therein under vacuum. The sealed bag and its contents are then kept in storage at a temperature below which gas evolution can occur. Thereafter the bag may be opened and the meat will have a dark red color that quickly changes into an attractive bright red color.

We prefer to employ the chilling step shortly after the first grinding. Freshly boned beef, when treated as described, gives particularly good results. The ground beef produced according to our invention is sometimes referred to as "hamburger."

Since the second grinding, if such grinding is employed, results in raising the temperature, we prefer to have the first chilling temperature sufficient to bring the internal temperature of the meat down to below 28–30° F. It is found that about six to twelve hours are required to bring the ground meat down to this temperature in the ordinary freezer vestibule where the temperature is ordinarily about 25° F. If a freezer having a lower temperature is employed, the chilling can be accomplished more rapidly. However, this more rapid chilling is found to require additional care and supervision to make sure that the meat does not freeze.

If the meat after chilling is reground, the internal temperature is raised but the temperature is kept below the gas evolution temperature described, and preferably below 38° F.

We have found it advantageous to package the meat shortly after the final grinding and while the temperature of the material is maintained below the gas evolution temperature. Where the grinding operation is carried on at room temperature, it is important to package the ground meat promptly after grinding, and we prefer that the grinding period and the packaging be accomplished within three hours so that the internal temperature of the meat will not rise above the gas evolution temperature.

After the meat, whether ground once or twice, has been chilled to the desired low temperature below the temperature at which gas evolution occurs, the meat is placed within an air-impervious bag and sealed therein after the removal of air by a vacuum pump. The sealed evacuated bag and its meat contents is then stored until its use is desired, and during such storage the temperature is maintained below the gas evolution temperature.

The bags employed for the storing operation may be of any suitable material or type which are effective in preserving the partial vacuum about the meat during storage. For example, a latex material as described in U.S. Patent No. 2,376,583 may be employed. Other plastic bags may be employed which are well known in the art and which are effective for retaining a vacuum and for excluding air. We prefer to employ flexible paper or resinous plastic bags such as those made of vinylidenechloride. We have found the use of 10 lb. casings very satisfactory, such casings being of a size, when lying flat, of about 9" x 24". Such casings may be closed at one end as by clamping to form a bag. The bag is then tightly packed with the ground meat. The meat will ordinarily occupy about 10", leaving an unfilled portion of about 7" at the unclamped end. This portion of the bag may then be wrapped around a vacuum tube or horn to place the contents of the bag under vacuum.

The degree of vacuum may vary substantially, depending upon the material being packaged and the conditions to which it is subjected. We prefer to employ a vacuum of about 20–25 inches Hg, and after the vacuum has been drawn, the operator seals the package by any suitable means, as, for example, by twisting the bag top and then clamping the top portion of the bag.

Under the conditions which have been described, we have been able to store meat for over fourteen days without loss of color or freshness. During this period of storage, the meat assumes a dark red color when viewed through the transparent casing. When the package is opened, it is found that the meat quickly assumes a bright red color. While the meat turns to an undesirable gray color after being exposed to the air for a period of over three hours, the desired bright red color persists during most of this period, making the product attractive as it is being used. Since the packages may be in relatively small sizes such as 10 lb. packages, the packages can thus be opened for use and the product, of bright red color, made available during the use period.

Meat prepared according to our invention is substantially superior to frozen ground meat because it retains its original moisture, while the frozen meat is dehydrated to a substantial extent. Further, the product of our invention can be immediately used without the delay that accompanies the thawing of frozen meats.

As illustrative of the process, the following specific examples may be set out.

*Example I*

150 lbs. of ground meat was chilled immediately after the meat had been boned, and then ground, the temperature being brought to 28° F. The meat was stored in the freezer vestibule having a temperature of approximately 25° F. for almost 12 hours. After this storage, the meat had an internal temperature of about 28° F. It was reground in a grinding room where the temperature was approximately 40° F., the internal temperature of the reground meat being 36° F. The reground meat was then packaged in a room having a temperature of about 40° F. in 10 lb. transparent plastic packages, using a vacuum pump having a tube 8" long and rectangular in cross section (1" x ½"). The open end of the vacuum tube, which was connected to the vacuum pump through a valved line, was introduced into the bag-like casing and the unfilled portion of the casing twisted around the tube. The open end of the vacuum tube was kept immediately adjacent the meat so as to prevent the casing walls from collapsing and preventing the tube from evacuating the casing. When a vacuum of about 20–25" Hg had been drawn on the casing, the operator twisted the casing, as by rotating, so as to seal the top of the casing against air passage and to permit sliding of the casing from the vacuum tube. The top portion of the casing was then clamped to form a package of ground meat. The clamping preserved the vacuum and sealed the casing for the storage period.

The packages thus sealed were stored in a room having a temperature of 36° F. and for a period of ten days. At the end of ten days, the package was opened and the meat removed. Approximately three minutes after the package was opened, the bright red color appeared on the surface of the meat, replacing the dark red appearance which the meat possessed when viewed through the package. The removed meat was moist, fresh, and had the desired bright red color above referred to.

*Example II*

200 lbs. of ground beef, immediately after grinding, was chilled to a temperature of 30° F. The ground meat, without a second grinding, was packaged within transparent plastic casings using a vacuum machine, as described in Example I. The sealed packages were stored in a freezer having a temperature of 36° F. for approximately nineteen days, after which the meat was removed from the refrigerator and found to be fresh. The meat, when viewed through the transparent bag, had a dark red appearance, but almost immediately after opening the bag, the meat assumed a bright red color and this color persisted during a two hour period during which the meat was being prepared prior to cooking.

*Example III*

150 lbs. of ground beef was chilled over a 6-hour period to a temperature of 29° F. The chilled meat was then reground in a room having a temperature of about 40° F. while keeping the internal temperature of the meat at about 40° F. The ground beef was then packaged in 10 lb. blocks in transparent plastic casings. A vacuum of approximately 25" Hg was drawn and the bag-like casing was sealed while under such reduced pressure. The package was stored at a temperature of approximately 42° F. for eighteen days and then opened in a room having a temperature of 70° F. After removal from the package, the meat was found to be moist and to have a bright red color. After cooking, the meat was found to have a taste comparable to that of freshly-ground meat.

*Example IV*

The process was carried out substantially as described in Example I, except that the packaged product was maintained in a refrigerator having a temperature of 48° F. At the end of ten days the meat was removed from the refrigerator and found to have a freshness and color similar to that described in Example I.

Samples of the meat ground and packaged in Example I were used in comparative tests to show the effect of storing meat above the gas evolution temperature. In one comparative test, some of the meat was stored in a refrigerator having a temperature of 50° F. After seven days, the meat packages were removed and found to be "puffed up," due to gas evolution in the meat. The package, upon being opened, presented a disagreeable odor and the meat was considered spoiled.

In another comparative test, a similar package of meat was taken from the refrigerator having an internal temperature of 36° F. and then placed on a table in a room having a temperature of 70° F. After two hours' storage in the room having this temperature, the package was replaced in the refrigerator and maintained under the chilling condition of 36° F. Upon removal of the package one day later, the package was found to be distended by reason of gas evolution in the meat, and the meat was found to be spoiled.

When a package of meat has had an internal temperature of 38° during the storage period and then is removed and stored in a room at a temperature of about 70°, the pressure continues to build up in the package and over a period of time the package becomes disrupted under the built-up pressure.

The process described can be carried out with a minimum of labor and expense while at the same time enabling ground meat, without being frozen, to be stored over substantial periods. It then possesses substantially the same fresh appearance and quality as freshly-ground meat, the dark red meat wtihin the transparent package very quickly assuming a bright red appearance upon contact with the air, which desirable appearance persists during the normal period of preparing of the meat prior to a cooking operation.

While in the foregoing specification we have set forth specific steps of the procedure in considerable detail for the purpose of illustrating the invention, it will be understood that such details of procedure may be varied widely by those skilled in the art without departing from the spirit of our invention.

We claim:
1. In a method of preserving ground beef, the steps of chilling said ground beef to a temperature of from about 25° F. to about 42° F. and promptly storing said beef in the substantial absence of air while at a temperature of from about 25° F. to about 42° F.

2. A method of producing ground beef comprising grinding freshly boned beef having an internal temperature of from about 25° F. to about 42° F., packaging said beef in an evacuated container constructed of material substantially impervious to passage of air therethrough, and promptly storing said beef at a temperature of from about 25° F. to about 42° F.

3. A method of producing ground beef comprising grinding freshly boned beef, chilling said beef to a temperature of from about 28° F. to about 30° F., regrinding said beef, packaging said beef in an evacuated container constructed of a material substantially impervious to passage of air therethrough, and promptly storing said beef at a temperature of from about 36° F. to about 38° F.

4. A method of producing ground beef comprising grinding freshly boned beef, chilling the beef to a temperature of from about 25° F. to about 42° F., regrinding and packaging said beef under such conditions that said beef is not exposed to air at room temperature for more than about three hours, and promptly storing said beef in the absence of air while at a temperature of from about 25° F. to about 42° F.

5. A method of producing ground beef comprising grinding freshly boned beef, chilling said beef by storage in an atmosphere of about 25° F. for about 6 to 12 hours, regrinding and packaging said beef under such conditions that said beef is not exposed to air at room temperature for from about three hours, and promptly storing said beef in the absence of air while at a temperature of from about 25° F. to about 42° F.

6. A product produced in accordance with the method of claim 1.

7. A product produced in accordance with the method of claim 4.

References Cited in the file of this patent
UNITED STATES PATENTS

| | | |
|---|---|---|
| 2,230,062 | Jordan | Jan. 28, 1941 |
| 2,348,176 | Gott et al. | May 2, 1944 |
| 2,376,583 | De Poix | May 22, 1945 |
| 2,623,826 | Grinstead | Dec. 30, 1952 |
| 2,792,306 | Harper | May 14, 1957 |
| 2,807,549 | Brasch et al. | Sept. 24, 1957 |
| 2,823,127 | Gwilliam et al. | Feb. 11, 1958 |
| 2,825,652 | Berkowitz | Mar. 4, 1958 |